(12) United States Patent
Hall

(10) Patent No.: US 9,116,240 B2
(45) Date of Patent: Aug. 25, 2015

(54) SYSTEM AND METHOD FOR ENSURING ADS-B INTEGRITY OF DEPARTING AIRCRAFT

(75) Inventor: William D. Hall, Stamford, CT (US)

(73) Assignee: MOSAIC ATM, INC., Leesburg, VA (US)

( * ) Notice: Subject to any disclaimer, the term of this patent is extended or adjusted under 35 U.S.C. 154(b) by 512 days.

(21) Appl. No.: 13/439,523

(22) Filed: Apr. 4, 2012

(65) Prior Publication Data
US 2013/0265187 A1    Oct. 10, 2013

(51) Int. Cl.
*G01S 13/91* (2006.01)
*G01S 13/93* (2006.01)
*G08G 5/00* (2006.01)
*G08G 5/06* (2006.01)

(52) U.S. Cl.
CPC .......... *G01S 13/9303* (2013.01); *G08G 5/0013* (2013.01); *G08G 5/0026* (2013.01); *G08G 5/065* (2013.01)

(58) Field of Classification Search
CPC . G01S 13/91; G01S 2013/916; G01S 13/931; G01S 13/9303; G08G 5/0013; G08G 5/0026; G08G 5/065
USPC ............... 342/29, 30, 36, 37, 44, 450, 455
See application file for complete search history.

(56) References Cited

U.S. PATENT DOCUMENTS

| | | | |
|---|---|---|---|
| 5,469,371 A * | 11/1995 | Bass ............................. | 358/474 |
| 5,629,691 A * | 5/1997 | Jain ............................. | 340/961 |
| 7,117,089 B2 * | 10/2006 | Khatwa et al. ............... | 701/301 |
| 7,224,291 B2 * | 5/2007 | Hassett ........................ | 340/928 |
| 7,383,124 B1 * | 6/2008 | Vesel ............................ | 701/517 |
| 7,423,590 B2 | 9/2008 | Smith | |
| 7,495,612 B2 | 2/2009 | Smith | |
| 7,570,214 B2 | 8/2009 | Smith et al. | |
| 7,612,716 B2 * | 11/2009 | Smith et al. ................... | 342/454 |
| 7,626,513 B2 | 12/2009 | Goodman et al. | |
| 7,730,307 B2 | 6/2010 | Viggiano et al. | |
| 7,876,259 B2 | 1/2011 | Schuchman | |
| 7,908,079 B1 * | 3/2011 | Dabney et al. ................ | 701/120 |
| 8,072,382 B2 | 12/2011 | Smith et al. | |
| 2007/0239986 A1 | 10/2007 | Viggiano et al. | |
| 2007/0252760 A1 | 11/2007 | Smith et al. | |
| 2009/0009395 A9 | 1/2009 | Smith | |
| 2010/0052973 A1 | 3/2010 | Fabre et al. | |
| 2010/0149019 A1 | 6/2010 | Smith et al. | |
| 2010/0312420 A1 | 12/2010 | Sham et al. | |
| 2011/0057830 A1 * | 3/2011 | Sampigethaya et al. ....... | 342/36 |
| 2011/0144897 A1 | 6/2011 | Dunsky | |
| 2011/0163908 A1 | 7/2011 | Andersson et al. | |
| 2011/0187580 A1 * | 8/2011 | Laenen et al. ................. | 342/29 |

FOREIGN PATENT DOCUMENTS

| | | |
|---|---|---|
| JP | 06-144396 A | 5/1994 |
| JP | 2008130047 A | 6/2008 |

* cited by examiner

*Primary Examiner* — John B Sotomayor
*Assistant Examiner* — Marcus Windrich
(74) *Attorney, Agent, or Firm* — AKC Patents, LLC; Aliki K. Collins (57) ABSTRACT

A system for ensuring Automatic Dependent Surveillance—Broadcast (ADS-B) integrity of an aircraft includes a designated aircraft interrogation area, an ADS-B receiver, and an alerting mechanism. The ADS-B receiver is configured to receive ADS-B data from the aircraft when the aircraft is located in the designated area and to send a signal to the alerting mechanism indicating that the aircraft is in the designated area.

44 Claims, 6 Drawing Sheets

```
┌─────────────────────────────────────────────────────────┐
│ Provide a system that includes an ADS-B receiver, an    │
│ indicator light, a sign, aircraft detection equipment,  │
│ a processor and a designated area      152              │
└─────────────────────────────────────────────────────────┘
                            ↓
┌─────────────────────────────────────────────────────────┐
│ Taxi aircraft to the designated area where the system   │
│ is installed  154                                        │
└─────────────────────────────────────────────────────────┘
                            ↓
┌─────────────────────────────────────────────────────────┐
│ Send ADS-B data from the aircraft to the ADS-B receiver │
│ and from the ADS-B receiver to the processor  155       │
└─────────────────────────────────────────────────────────┘
                            ↓
┌─────────────────────────────────────────────────────────┐
│ Detect aircraft with the aircraft detection equipment   │
│ and send a detection signal to the processor  156       │
└─────────────────────────────────────────────────────────┘
                            ↓
┌─────────────────────────────────────────────────────────┐
│ Processor compares the aircraft detection signal with   │
│ the ADS-B data and sends a signal to the indicator      │
│ light and the sign.  157                                 │
└─────────────────────────────────────────────────────────┘
                            ↓
                         ◇ ─────────────┐
                            ↓            │
┌──────────────────────────────────┐    │
│ If there is a discrepancy between │    │
│ the ADS-B data and the aircraft   │    │
│ detection signal, or if the       │    │
│ ADS-B signal is otherwise flawed  │    │
│ an alert signal is transmitted to │    │
│ the indicator light, the sign, an │    │
│ operation center and government   │    │
│ organizations  158                │    │
└──────────────────────────────────┘    │
                                         ↓
        ┌────────────────────────────────────────────┐
        │ If there is no discrepancy between the     │
        │ ADS-B data and the aircraft detection      │
        │ signal and the ADS-B data are successfully │
        │ transmitted to the ADS-B receiver, the     │
        │ indicator light is illuminated and and     │
        │ aircraft registration number and flight    │
        │ number are displayed on the sign  159      │
        └────────────────────────────────────────────┘
```

SYSTEM AND METHOD FOR ENSURING ADS-B INTEGRITY OF DEPARTING AIRCRAFT

FIELD OF THE INVENTION

The present invention relates to an improved system and method for ensuring ADS-B integrity of departing aircraft and in particular to a system and a method that ensures the integrity of the ADS-B systems of aircraft prior to their take-off

BACKGROUND OF THE INVENTION

As part of the modernization of the US Air Traffic Control system known as NextGen, as well as deployments in Australia, on the Atlantic Oceanic routes, and elsewhere, Automatic Dependent Surveillance—Broadcast (ADS-B) is poised to become a key part of the surveillance infrastructure for aviation around the world. In ADS-B, each equipped vehicle transmits its position, altitude, velocity, identity and other information at regular intervals through an onboard transmitter (ADS-B Out). Nearby equipped vehicles receive these position reports through a receiver and can use them to avoid colliding with the reporting vehicle (ADS-B In). Air traffic control also may receive the position reports and use them to coordinate separation among vehicles under their control, much as they do today with radar-based surveillance. ADS-B data may also be recorded and downloaded for post flight analysis. The ADS-B system includes a certified source of navigation data (i.e., high-integrity GPS system), a transmitting system, a datalink and transport protocol and a receiving system. Examples of ADS-B data links include transponders operating at 1090 MHz, at 978 MHz or VHF.

ADS-B has many advantages over conventional surveillance techniques. It provides improved situation awareness, improved visibility, reduced environmental impact, and increased safety and efficiency. It has the potential to be more accurate than radar surveillance, which may allow aircraft to safely operate closer to one another in densely trafficked areas. It may be less costly to install and maintain than other forms of surveillance. It also has the potential to enable more efficient, faster and more robust decentralized separation assurance as compared to the conventional radar-based centralized separation assurance.

However, ADS-B as presently available faces a significant flaw, in that it relies on the accuracy of the navigation system of each vehicle and on the correct function of the ADS-B transmission equipment of each vehicle. If any of the equipment on any of the vehicles involved malfunction or be incorrectly configured, a real risk of collision is the result. Furthermore, should the navigation system onboard an aircraft fail, the current radar surveillance system provides a backup that can guide the aircraft; with ADS-B, there is no surveillance-based backup. Finally, it is possible to broadcast position reports unconnected to any real aircraft in an attempt to disrupt air traffic maliciously. Several patents have been filed or awarded to address some aspects of these weaknesses.

A number of patents and patent applications claim inventions that identify terrorist or otherwise dangerously controlled aircraft. US20110144897 describes systems and methods to track and identify suspect aircraft. US20100052973 describes a device and method to identify aircraft that pose a threat of collision on the ground. However, these systems and methods rely on the integrity of the navigation and surveillance systems comprising ADS-B.

US20110140950 describes an approach in which the recipient of an ADS-B position report compares the distance to the reporting vehicle, as determined by time-of-flight of the ADS-B transmission, with the distance to the reported position, and alerts if there is a significant discrepancy. This approach fails to detect a malfunction wherein both aircraft positions are erroneous but the calculated distance between them is not, such as could occur were both aircraft relying on the same erroneous means of navigation. It also fails to detect potential collisions with aircraft not transmitting ADS-B positions. It does not identify whether either of the two aircraft involved is broadcasting the correct position, nor does it identify which aircraft is broadcasting the wrong position if only one is. Finally, an erroneously broadcasting aircraft departing an airfield with little activity is likely airborne before the problem can be detected this way.

Similarly, US2011/0057830 describes systems and methods to validate suspect aircraft position reports by a group of receiving aircraft which communicate with each other to share observed relative positions to the suspect aircraft. In this way, the group can estimate position of the suspect aircraft and compare that position estimate to the position reported in the suspect's transmission. This approach is complicated, requires considerable additional communications bandwidth, and is unlikely to be implemented in time for the desired use of ADS-B. Additionally, it is unlikely to detect an erroneously broadcasting aircraft departing an airfield with little activity before it becomes airborne.

US20110163908 describes systems and methods to validate suspect aircraft position reports using direction finding equipment onboard the receiving aircraft. The complexity to implement additional directional antennas and direction-finding equipment onboard aircraft would pose some cost and logistical issues. This approach fails to detect a malfunction wherein both aircraft positions are erroneous but the calculated bearing between them is not, such as could occur were both aircraft relying on the same erroneous means of navigation. It also fails to detect potential collisions with aircraft not transmitting ADS-B positions. It does not identify whether either of the two aircraft involved is broadcasting the correct position, nor does it identify which aircraft is broadcasting the wrong position if only one is. Finally, an erroneously broadcasting aircraft departing an airfield with little activity is likely airborne before the problem can be detected this way.

U.S. Pat. No. 7,423,590 and application US20090009395 describe systems for authenticating aircraft identification and position transmissions by comparing them to a secondary position measurement source such as radar or multilateration. This solution would be expensive, in that one of the hopes with ADS-B is to eliminate costly surveillance systems. It fails to detect problems wherein an aircraft is not transmitting its position at all, and it does nothing to determine accuracy of the aircraft identification and type broadcast. Finally, an erroneously broadcasting aircraft departing an airfield with too little activity to justify a secondary position measurement source with coverage of the surface will be airborne before the problem can be detected this way.

U.S. Pat. No. 7,570,214 describes a method and a system for validating ADS-B transmitted positions against time of arrival of the ADS-B transmission at multiple locations. This approach suffers from similar shortcomings to those discussed above.

U.S. Pat. No. 7,383,124 describes an ADS-B monitoring device that "listens" to the aircraft's ADS-B transmissions and compares them to the signal sent to the ADS-B transponder for transmission. This system could detect some problems with the aircraft's ADS-B transmission equipment. However, it requires that yet another system be installed on the aircraft, and it does not detect errors in the signal sent for transmission, such as navigation system errors.

Accordingly, there is a need for an improved system and method for ensuring ADS-B integrity of departing aircraft that addresses the above mentioned problems.

SUMMARY OF THE INVENTION

In general, in one aspect, the invention features a system for ensuring Automatic Dependent Surveillance—Broadcast (ADS-B) integrity of an aircraft including a designated aircraft interrogation area, an ADS-B receiver, and an alerting mechanism. The ADS-B receiver is configured to receive ADS-B data from the aircraft when the aircraft is located in the designated area and to send a signal to the alerting mechanism indicating that the aircraft is in the designated area.

Implementations of this aspect of the invention may include one or more of the following features. The alerting mechanism is a sign that displays a registration number of the aircraft when the aircraft is indicated to be in the designated aircraft interrogation area. The sign may further display a scheduled flight number of the aircraft when the aircraft is indicated to be in the designated aircraft interrogation area. The alerting mechanism includes an indicator that provides a first indication that no valid ADS-B signal is detected within the designated aircraft interrogation area when there is a flaw in the received ADS-B data or when no ADS-B data containing positions within the designated interrogation area are received. The indicator further provides a second indication that a valid ADS-B signal is detected within the designated aircraft interrogation area when there is no flaw in the received ADS-B data. The indicator may be a light that is illuminated with a specific color and pattern when there is no valid ADS-B signal or when no ADS-B data are received and with a different specific color and pattern when a valid ADS-B signal is detected. A no-valid ADS-B signal is indicated when the strength of the received ADS-B signal does not exceed a preselected value. A no valid ADS-B signal is indicated when the position data in the received ADS-B data do not match the position of the aircraft in the designated aircraft interrogation area. A no valid ADS-B signal is indicated when the aircraft type data in the received ADS-B data do not match the type of the aircraft in the designated aircraft interrogation area. A no valid ADS-B signal is indicated when the aircraft registration number in the received ADS-B data does not match the registration number of the aircraft in the designated aircraft interrogation area. The alerting mechanism may be an announcement on a voice radio frequency. The alerting mechanism may be a data transmission over a wired or wireless communication system. The data transmission may further include a video recording of the aircraft. The data transmission is sent to an air traffic control facility, aircraft pilot, a security organization, police, homeland security, military, fire department, or airline operations control. The data transmission is received by an airline operations control and the transmitted data are cross-referenced with air traffic-control data provided by a third party. The system further includes an aircraft detection system, and the aircraft detection system is configured to detect an aircraft entering the designated aircraft interrogation area. The aircraft detection system is configured to identify the registration number of the aircraft. The aircraft detection system may be a visible-spectrum camera and image recognition software or an IR-spectrum camera and image recognition software. The system may further include a processor configured to compare data received from the ADS-B receiver with data received from the aircraft detection system and to activate the alerting mechanism if there is a discrepancy between the received ADS-B data and the aircraft detection system data. The system may further include a processor, validity check software and a third party database and the processor is configured to compare data received from the ADS-B receiver with data received from the third party database and to analyze the data with the validity check software. The processor is configured to activate the alerting mechanism if the analysis by the validity check software indicates a discrepancy between the received ADS-B data and the third party database data.

In general, in another aspect, the invention features a system for ensuring Automatic Dependent Surveillance—Broadcast (ADS-B) integrity of an aircraft including an ADS-B receiver, a processor, validity check software, a third party database and an alerting mechanism. The processor is configured to compare data received from the ADS-B receiver with data received from the third party database and to analyze said data with said validity check software. The processor is also configured to activate the alerting mechanism if the analysis by the validity check software indicates a discrepancy between the received ADS-B data and the third party database data.

In general, in another aspect, the invention features a method for ensuring Automatic Dependent Surveillance—Broadcast (ADS-B) integrity of an aircraft including the following. Providing a designated aircraft interrogation area, an ADS-B receiver, and an alerting mechanism. Receiving ADS-B data from the aircraft when the aircraft is located in the designated area and sending a signal to the alerting mechanism indicating that the aircraft is in the designated area.

In general, in another aspect, the invention features a method for ensuring Automatic Dependent Surveillance—Broadcast (ADS-B) integrity of an aircraft including the following. Providing an ADS-B receiver, a processor, validity check software, a third party database and an alerting mechanism. Comparing data received from the ADS-B receiver with data received from the third party database by the processor and analyzing said data with said validity check software. Activating the alerting mechanism if the analysis by the validity check software indicates a discrepancy between the received ADS-B data and the third party database data.

The details of one or more embodiments of the invention are set forth in the accompanying drawings and description below. Other features, objects and advantages of the invention will be apparent from the following description of the preferred embodiments, from the drawings and from the claims.

BRIEF DESCRIPTION OF THE DRAWINGS

Referring to the figures, wherein like numerals represent like parts throughout the several views.

DETAILED DESCRIPTION OF THE INVENTION

The present invention detects and alerts problems with the navigation or electronic communications systems comprising an aircraft's ADS-B system to reduce significantly the risks of collision between the aircraft and obstacles, terrain or other aircraft. Whereas the focus of the systems and methods described in the prior art generally act only after the malfunction has presented a risk to the crew and passengers of the affected flight for some time, the present invention detects problems before the aircraft takes off. A very large portion of equipment malfunctions occurs while the aircraft is on the ground. Many initialization errors that can cause malfunctions occur while avionics are being powered up. Many other failures occur while the aircraft is powered down—a state in which most aircraft spend the majority of their time. The only time to catch these common errors before they present a hazard is before the aircraft leaves the ground.

The present invention provides a system that detects, identifies and alerts of ADS-B errors before they present a hazard. Several different detection modes are included, as some may be more cost effective in some situations than others or may apply only in some situations. Several forms of alerting appropriate to different situations are also included.

Figure 1:
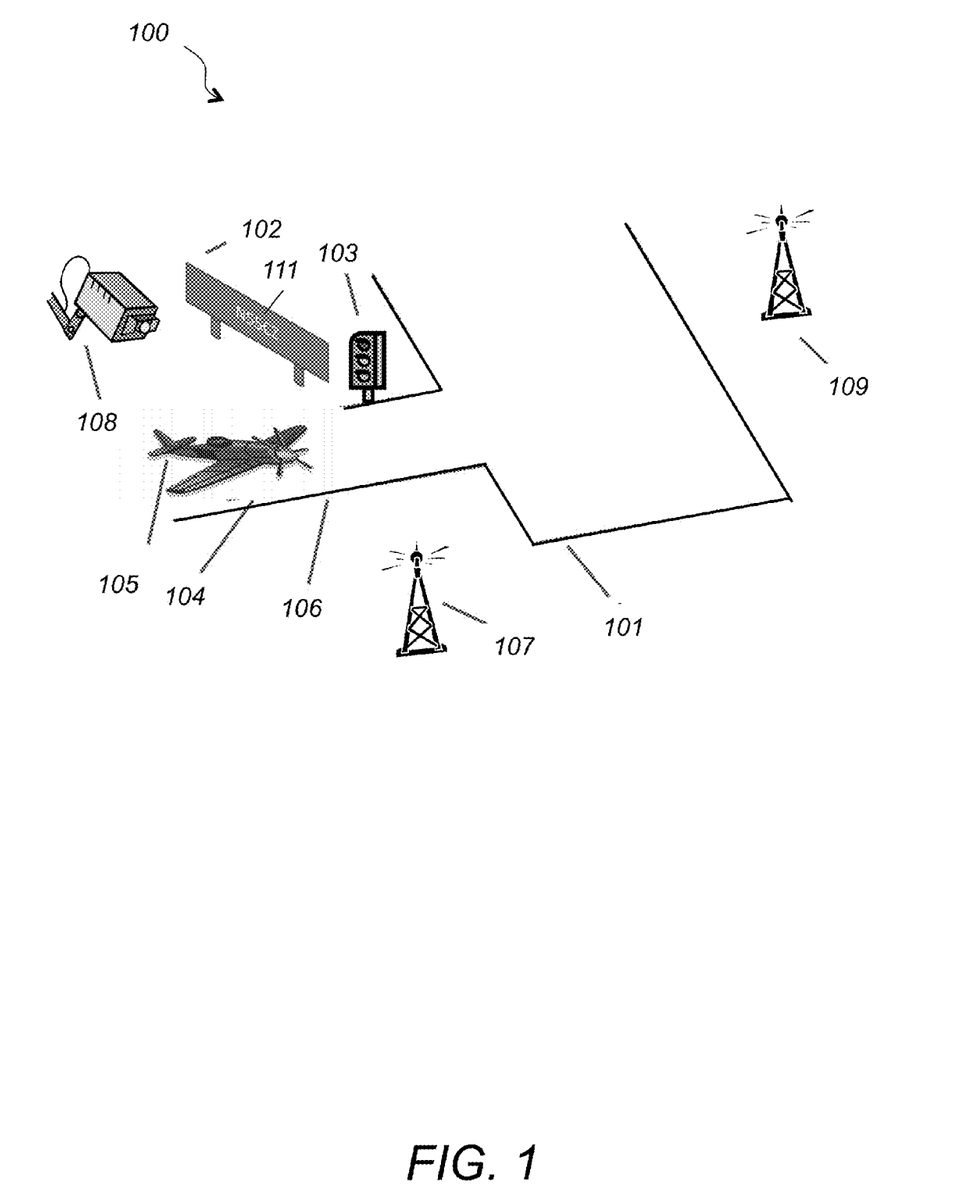
FIG. 1 is a schematic diagram of a first embodiment of the improved ADS-B system according to this invention.

The improved ADS-B system includes components that provide positive identification of an aircraft, verification of ADS-B transmission signal strength, navigation accuracy and aircraft identification information, confirmation indicators of proper function and alerting of malfunction. Referring to FIG. 1, system 100 includes a designated area on the surface 104, a sign 102, an ADS-B receiver 107, aircraft detection equipment 108, an indicator light 103 and a radio transmitter 109. Designated area 104 is located on a taxiway 106 near the intersection with a runway 101. Sign 102 displays the registration or flight ID 111 of the aircraft 105 when it is in the designated area 104 as indicated by reception of ADS-B data as received by the ADS-B receiver 107. If the received data do not match the indications from the aircraft detection equipment 108 (i.e., not correct aircraft location), or if the received signal is of insufficient strength or otherwise flawed, an indication is provided on the sign 102, on the indicator lights 103 and via voice VHF transmission via the radio transmitter 109. Indicator light 103 is positioned in an area where the pilot of the aircraft leaving the designated area 104 can see it. In some embodiments, system 100 may be configured with a subset of the components of FIG. 1. In one example, a low-cost system to provide information to the pilot includes an ADS-B receiver 107 and an indicator light 103. The indicator light 103 illuminates when the received ADS-B data indicate an aircraft 105 is in the designated area 104. A slightly more advanced system includes the ADS-B receiver 107 connected to an electronic sign 102 to display the registration number of the aircraft 105 in the designated area 104. Either of these systems provide verification for the pilot that the ADS-B equipment onboard his aircraft is functioning correctly before departure. In one example, the aircraft detection equipment 108 is an electromagnetic imager, such as a visible-spectrum camera, a night vision infrared (IR) camera and image recognition software. The aircraft detection equipment 108 identifies the type of aircraft and the registration number of the aircraft and sends a signal to a processor 113, shown in FIG. 2. The components of system 100 are connected with each other via a wired or a wireless communication network 90, shown in FIG. 2. Data transmissions to and from the ADS-B receiver 107 occur via network 90. As was mentioned above, the alerting mechanism may be an announcement on a voice VHF radio frequency via radio transmitter 109, illumination of the sign 102, illumination of the indicator light 103, transmission of an electronic message to an air traffic control facility 117, transmission of an electronic message to a security organization such as the police, department of homeland security, the military or the Transportation Security Administration (TSA), or transmission of an electronic message to the airline that has operational control over the specific flight. The operational control of a specific flight is determined by cross-referencing air traffic control data feeds such as Aircraft Situation Display to Industry (ASDI) or Enhanced Traffic Management System (ETMS), among others. The transmitted electronic message includes the aircraft registration number, flight number, and flight equipment status information. In some cases, a video recording of the aircraft is made and the recording is included as part of the transmitted electronic message.

Figure 2:
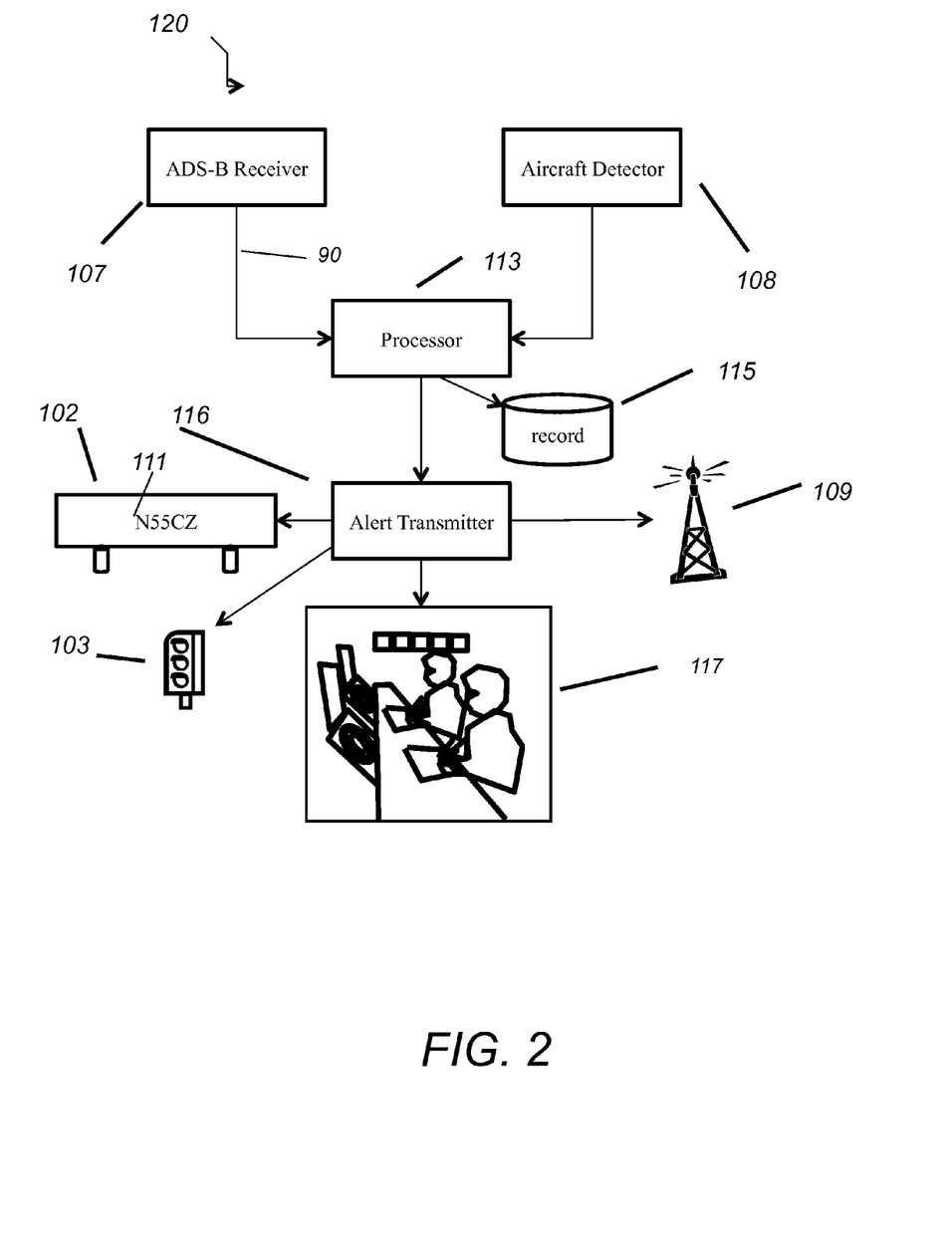
FIG. 2 depicts a second embodiment of the improved ADS-B system according to this invention.

Referring to FIG. 2, the ADS-B receiver 107 is connected to a processor 113 which also takes input from an optional aircraft detector 108. The processor 113 stores a recording to a storage medium 115 of evidence that may prove useful in later investigation, such as video of aircraft without functioning ADS-B transmissions. The processor 113 sends information through an alert transmitter 116 to signage 102, indicator light 103, voice or data radio transmission 109, and/or to an operations center 117 or similar facility used to coordinate police, homeland security, the military, FAA, airline operations and/or similar organizations.

Figure 3:
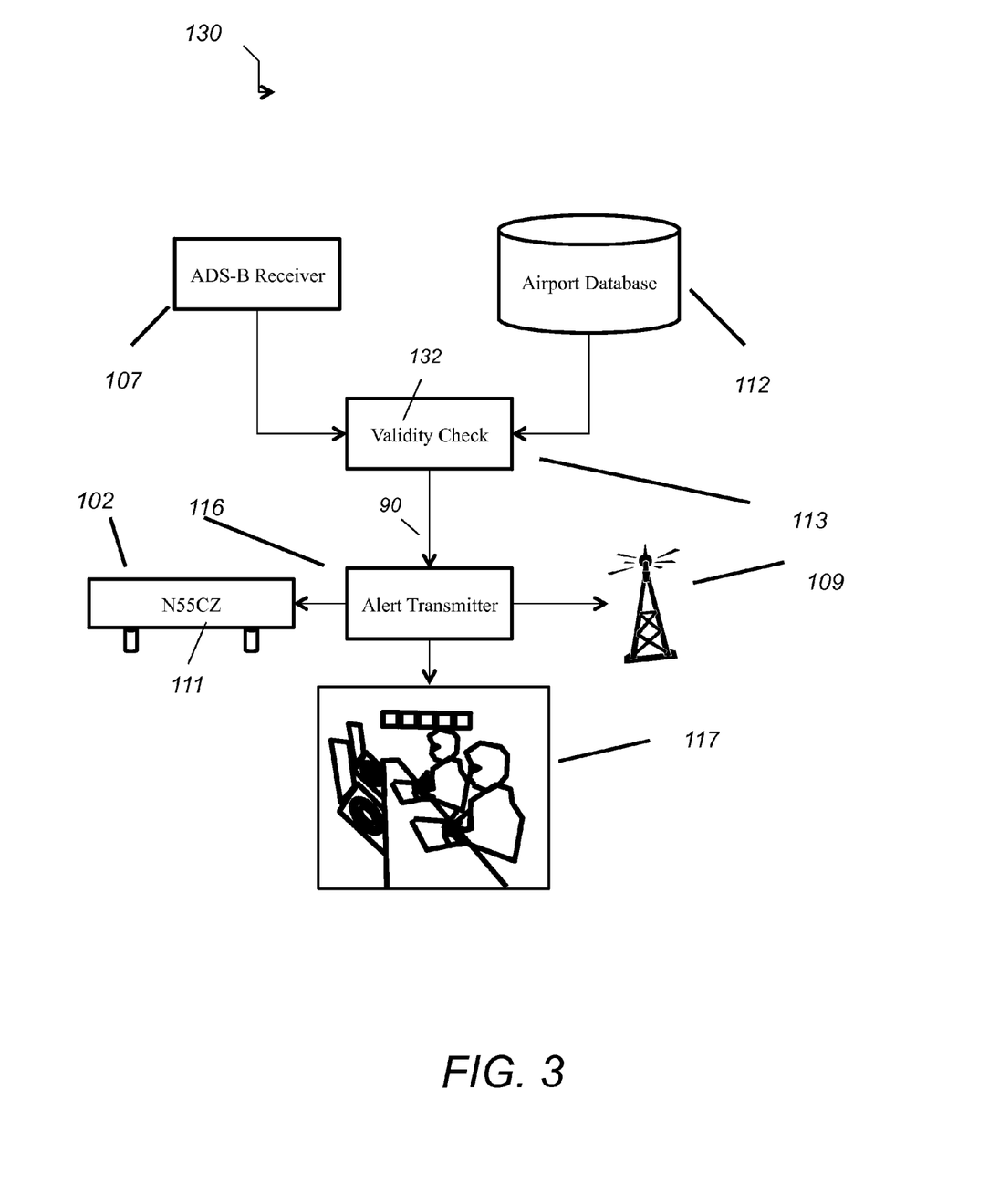
FIG. 3 is a schematic diagram of a third embodiment of the improved ADS-B system according to this invention.

Referring to FIG. 3, in another embodiment 130, aircraft trajectory data from an ADS-B receiver 107 are compared to data from an airport database 112 by a validity check algorithm 132 running on a server 113. When the ADS-B data indicate an abnormal condition such as a taxi path across non-navigable areas or that in other ways does not match the capabilities of the aircraft type, an alert transmitter 116 sends out an alert via reconfigurable signs and light displays 102, voice and/or data radio 109, and/or to an operations center 117 or similar facility used to coordinate police, homeland security, the military, FAA, airline operations and/or similar organizations.

Figure 4:
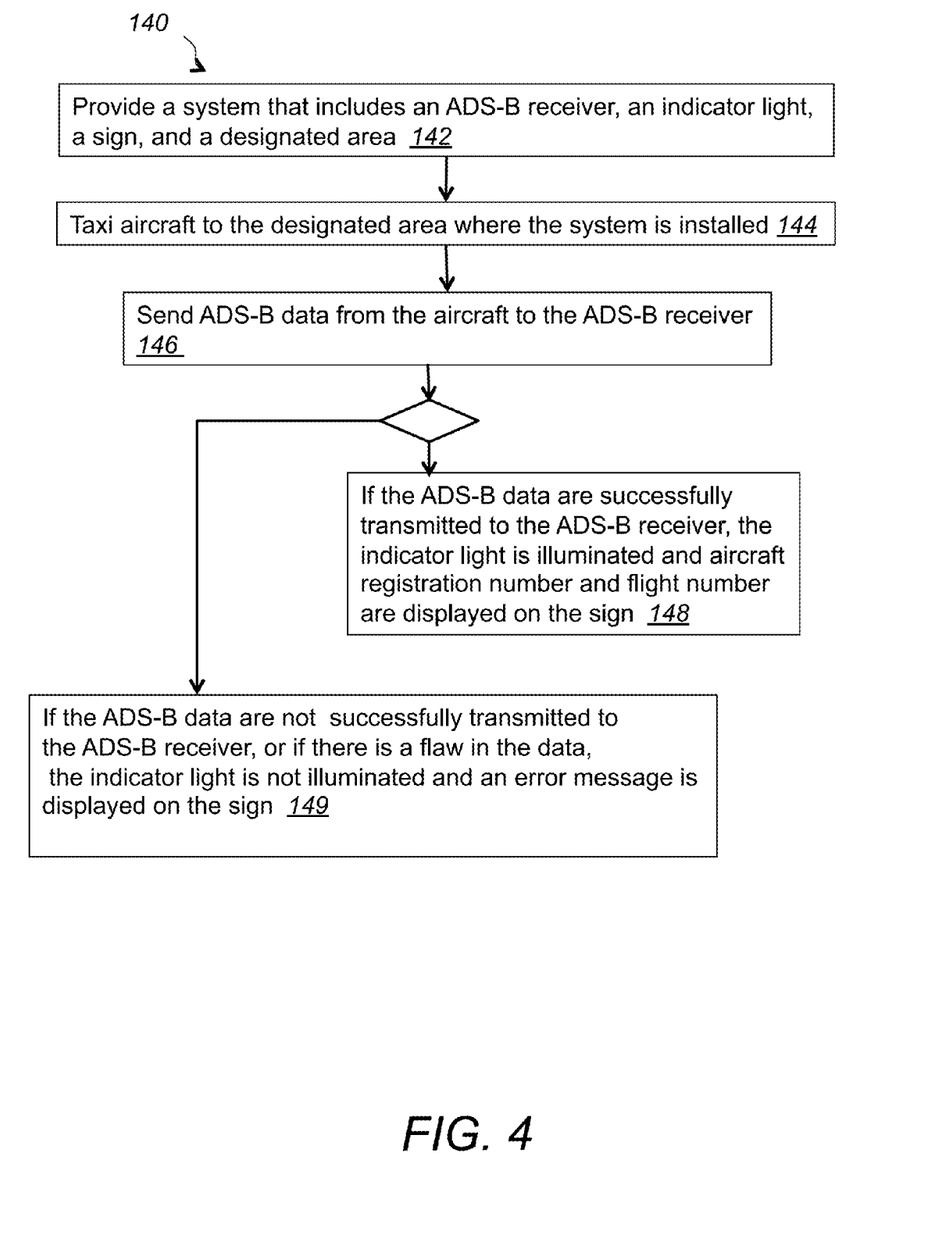
FIG. 4 is a flow diagram of a first embodiment of the improved ADS-B method according to this invention.

Referring to FIG. 4, a first embodiment of a method 140 for ensuring ADS-B integrity of a departing aircraft includes the following. First, an interrogation system is provided that includes an ADS-B receiver, an indicator light, and a sign (142). The interrogation system is installed in a designated area. Each aircraft equipped with an ADS-B system is brought to the designated area (144) and the ADS-B system is tested by sending ADS-B data from the aircraft's ADS-B transmitter to the ADS-B receiver of the interrogation system (146). The ADS-B data contain the location of the aircraft. If the ADS-B data are successfully received by the ADS-B receiver and they do not contain any flaws (i.e., correct location of the aircraft and strong enough signal), the indicator light is illuminated in a pattern and color that indicates good system operation and the aircraft's registration number and flight number are displayed on the sign (148). If the ADS-B data are not successfully received by the ADS-B receiver or if they contain flaws, the indicator light is not illuminated or is illuminated in a different pattern or color that indicates malfunction and the sign depicts an error message (149).

Figure 5:
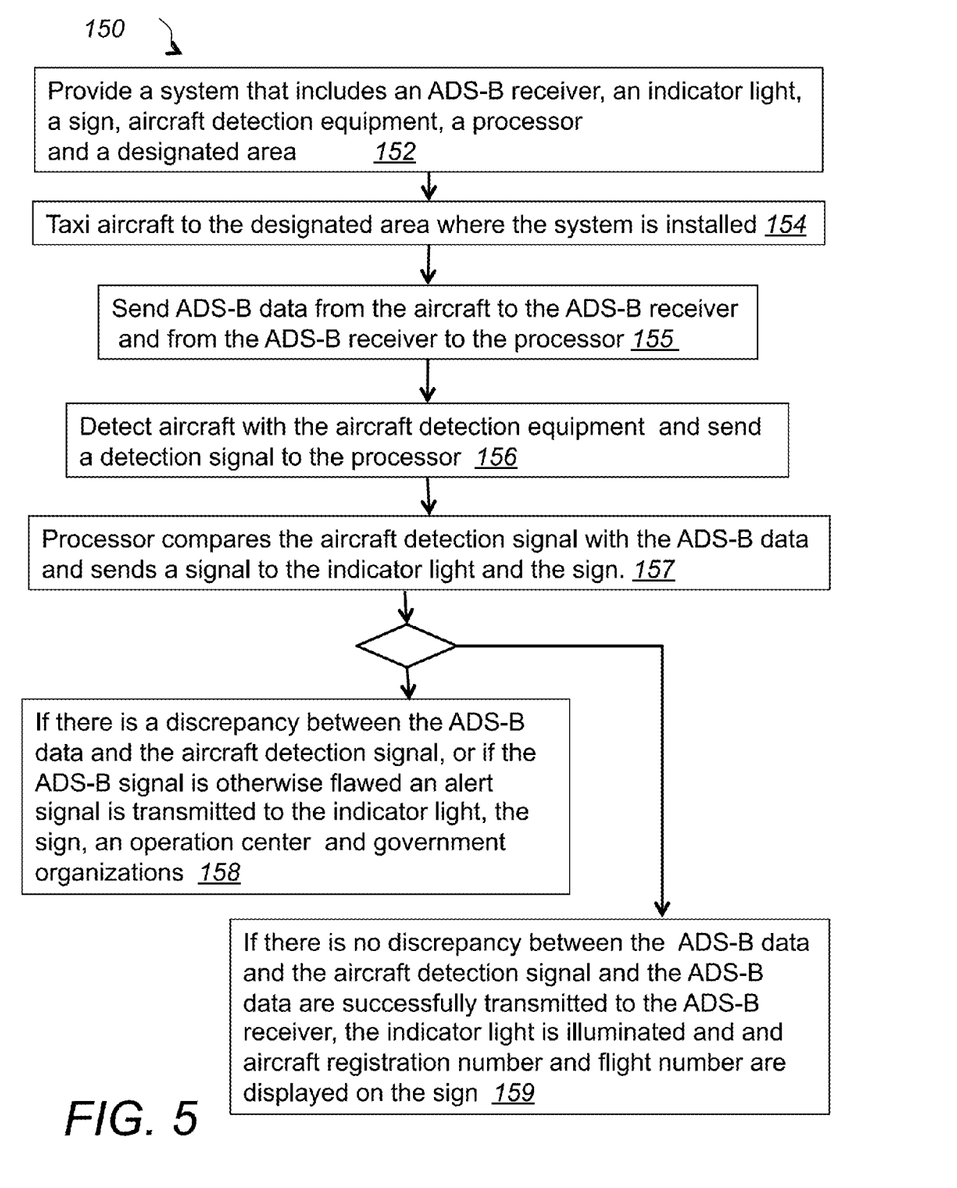
FIG. 5 is a flow diagram of a second embodiment of the improved ADS-B method according to this invention.

Referring to FIG. 5, a second embodiment of a method 150 for ensuring ADS-B integrity of a departing aircraft includes the following. First, an interrogation system is provided that includes an ADS-B receiver, an indicator light, a sign, aircraft detection equipment and a processor (152). The interrogation system is installed in a designated area. Each aircraft equipped with an ADS-B system is brought to the designated area (154) and the ADS-B system is tested by sending ADS-B data from the aircraft's ADS-B transmitter to the ADS-B receiver of the interrogation system and to the processor (155). The aircraft is detected with the aircraft detection equipment and a detection signal is sent to the processor (156). The processor compares the aircraft detection signal with the received ADS-B data and sends a signal to the indicator light and the sign indicating if there is discrepancy or not (157). If there is no discrepancy and if the ADS-B data are successfully received by the ADS-B receiver and they do not contain any flaws, the indicator light is illuminated in a pattern and color that indicates good system operation and the aircraft's registration number and flight number are displayed on the sign (159). If there is discrepancy between the received ADS-B data and the aircraft detection signal or if the signal is otherwise flawed an alert signal is transmitted to the indicator light, the signal, a flight operation center and a government organization (158).

Figure 6:
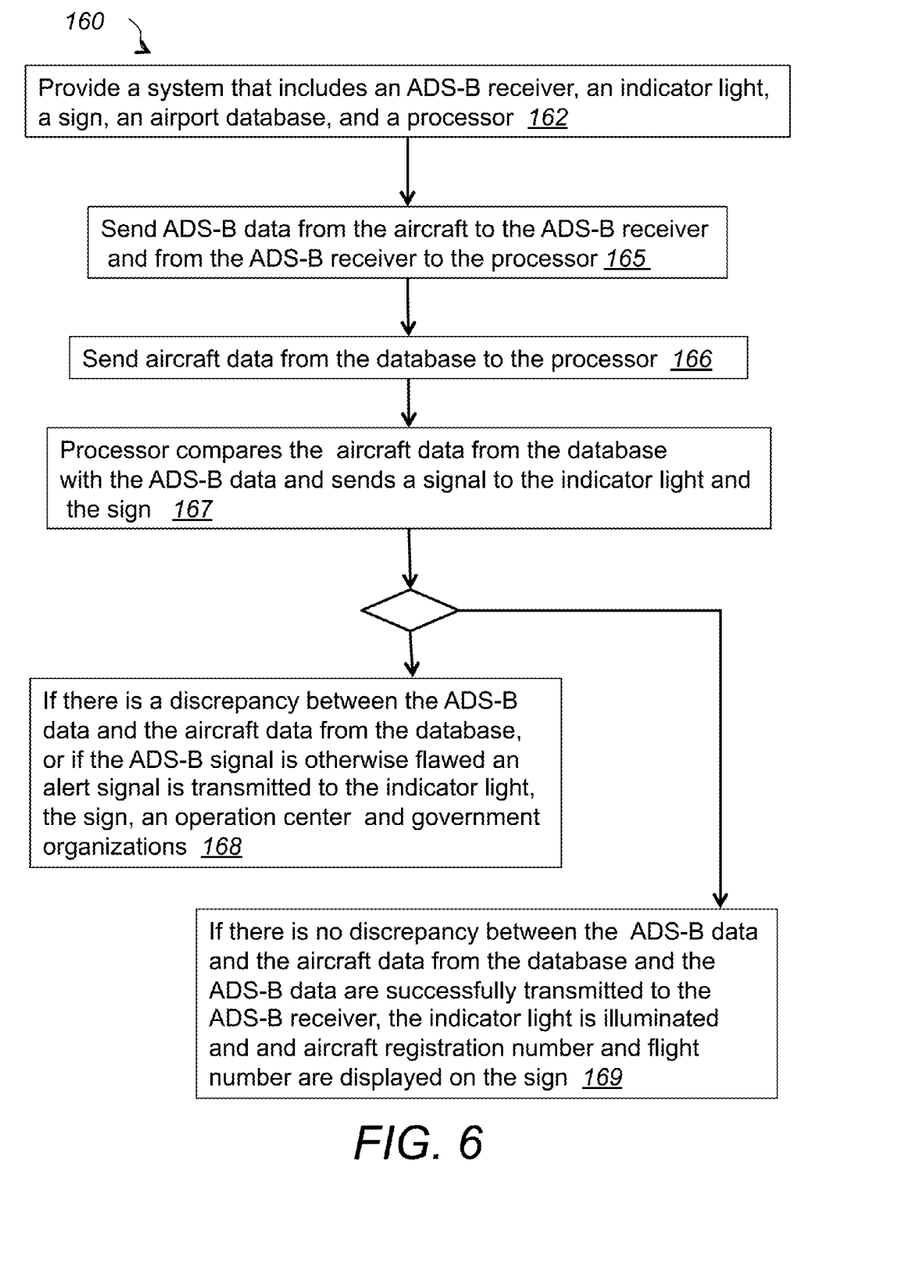
FIG. 6 is a flow diagram of a third embodiment of the improved ADS-B method according to this invention.

Referring to FIG. 6, a third embodiment of a method 160 for ensuring ADS-B integrity of a departing aircraft includes the following. First, an interrogation system is provided that includes an ADS-B receiver, an indicator light, a sign, an airport database and a processor (162). Each aircraft equipped with an ADS-B system is tested by sending ADS-B data from the aircraft's ADS-B transmitter to the ADS-B receiver of the interrogation system and to the processor (165). Aircraft specific data are also sent from the airport database to the processor (166). The processor compares the aircraft specific data from the database with the received ADS-B data and sends a signal to the indicator light and the sign indicating if there is discrepancy or not (167). If there is no discrepancy and if the ADS-B data are successfully received by the ADS-B receiver and they do not contain any flaws, the indicator light is illuminated in a pattern and color that indicates good system operation and the aircraft's registration number and flight number are displayed on the sign (169). If there is discrepancy between the received ADS-B data and the aircraft specific data from the database or if the signal is otherwise flawed an alert signal is transmitted to the indicator light, the signal, a flight operation center and a government organization (168).

Several embodiments of the present invention have been described. Nevertheless, it will be understood that various modifications may be made without departing from the spirit and scope of the invention. Accordingly, other embodiments are within the scope of the following claims.

What is claimed is:

1. A system for ensuring Automatic Dependent Surveillance-Broadcast (ADS-B) integrity of an aircraft comprising:
   a designated aircraft interrogation area, not located in a runway;
   an ADS-B receiver located outside of the aircraft;
   an alerting mechanism located outside of the aircraft and being configured to provide indications that are observable from any location within the designated aircraft interrogation area by crewmembers operating the aircraft;
   wherein the ADS-B receiver is configured to receive ADS-B data transmitted from an ADS-B transmitter located in the aircraft while the aircraft is located within the designated aircraft interrogation area, wherein the ADS-B data comprise position, velocity and identity data and wherein upon receipt of ADS-B position data reporting a position of the aircraft within the designated aircraft interrogation area to send a signal to the alerting mechanism activating an indication that the aircraft is broadcasting ADS-B positions that are located within the designated aircraft interrogation area.

2. The system of claim 1, wherein the alerting mechanism comprises a sign that displays a registration number of the aircraft when the aircraft is indicated to be in the designated aircraft interrogation area.

3. The system of claim 2, wherein the sign further displays a scheduled flight number of the aircraft when the aircraft is indicated to be in the designated aircraft interrogation area.

4. The system of claim 1, wherein the alerting mechanism comprises an indicator that provides a first indication that no valid ADS-B signal is detected within the designated aircraft interrogation area when there is a flaw in the received ADS-B data or when no ADS-B data containing positions within the designated aircraft interrogation area are received.

5. The system of claim 4, wherein the indicator further provides a second indication that a valid ADS-B signal is detected within the designated aircraft interrogation area when there is no flaw in the received ADS-B data.

6. The system of claim 5, wherein the indicator comprises a light that is illuminated with a specific color and pattern when there is no valid ADS-B signal or when no ADS-B data are received and with a different specific color and pattern when a valid ADS-B signal is detected.

7. The system of claim 4, wherein a no-valid ADS-B signal is indicated when the strength of the received ADS-B signal does not exceed a preselected value.

8. The system of claim 4, wherein a no valid ADS-B signal is indicated when the ADS-B position data in the received ADS-B data do not match position data of the aircraft in the designated aircraft interrogation area transmitted by an aircraft detection system configured to detect an aircraft's position within the designated aircraft interrogation area independently from any navigation source on the aircraft.

9. The system of claim 4, wherein a no valid ADS-B signal is indicated when aircraft type data in the received ADS-B data do not match a type of the aircraft in the designated aircraft interrogation area transmitted by an aircraft detection system configured to detect the type of the aircraft.

10. The system of claim 4, wherein a no valid ADS-B signal is indicated when an aircraft registration number in the received ADS-B data does not match a registration number of the aircraft in the designated aircraft interrogation area, transmitted by an aircraft detection system configured to detect the aircraft registration number.

11. The system of claim 1 wherein the alerting mechanism comprises an announcement on a voice radio frequency.

12. The system of claim 1, wherein the alerting mechanism comprises a data transmission over a wired or wireless communication system.

13. The system of claim 12, wherein said data transmission further comprises a video recording of the aircraft recorded by an electromagnetic imager.

14. The system of claim 13, wherein said data transmission is sent to one of an air traffic control facility, aircraft pilot, a security organization, police, homeland security, military, fire department, or airline operations control.

15. The system of claim 13 wherein said data transmission is received by an airline operations control and the transmitted data are cross-referenced with air traffic-control data provided by air traffic control data feeds including Aircraft Situation Display to Industry (ASDI) or Enhanced Traffic Management System (ETMS).

16. The system of claim 1 further comprising an aircraft detection system, wherein the aircraft detection system is configured to detect an aircraft entering the designated aircraft interrogation area and to provide confirmation of the aircraft's location within the designated aircraft interrogation area.

17. The system of claim 16, wherein the aircraft detection system is configured to identify the type and registration number of the aircraft.

18. The system of claim 17, wherein the aircraft detection system comprises a visible-spectrum camera and image recognition software.

19. The system of claim 17, wherein the aircraft detection system comprises an IR-spectrum camera and image recognition software.

20. The system of claim 19, further comprising a processor configured to compare data received from the ADS-B receiver with data received from the aircraft detection system and to activate the alerting mechanism if there is a discrepancy between the received ADS-B data and the aircraft detection system data.

21. A system for ensuring Automatic Dependent Surveillance-Broadcast (ADS-B) integrity of an aircraft comprising:
an ADS-B receiver located outside of the aircraft;
a processor;
validity check software;
air traffic control data feeds including Aircraft Situation Display to Industry (ASDI) or Enhanced Traffic Management System (ETMS);
an alerting mechanism located outside of the aircraft and being configured to provide indications that are observable from any location within a designated aircraft interrogation area by crewmembers operating the aircraft; and
wherein said processor is configured to compare data received from the ADS-B receiver with data received from the air traffic control data feeds and to analyze said data with said validity check software; and
wherein the ADS-B data comprise position, velocity an identity data.

22. The system of claim 21, wherein said processor is configured to activate the alerting mechanism if the analysis by the validity check software indicates a discrepancy between the received ADS-B data and the air traffic control data feeds.

23. A method for ensuring Automatic Dependent Surveillance-Broadcast (ADS-B) integrity of an aircraft comprising:
providing a designated aircraft interrogation area, not located in a runway;
providing an ADS-B receiver located outside of the aircraft;
providing an alerting mechanism located outside of the aircraft and being configured to provide indications that are observable from any location within the designated aircraft interrogation area by crewmembers operating the aircraft;
wherein the ADS-B receiver is configured to receive ADS-B data transmitted from an ADS-B transmitter located in the aircraft while the aircraft is located within the designated aircraft interrogation area, wherein the ADS-B data comprise position, velocity and identity data, and wherein upon receipt of the ADS-B position data reporting a position of the aircraft within the designated aircraft interrogation area to send a signal to the alerting mechanism activating an indication that the aircraft is broadcasting ADS-B positions that are located within the designated aircraft interrogation area.

24. The method of claim 23, wherein the alerting mechanism comprises a sign that displays a registration number of the aircraft when the aircraft is indicated to be in the designated aircraft interrogation area.

25. The method of claim 24, wherein the sign further displays a scheduled flight number of the aircraft when the aircraft is indicated to be in the designated aircraft interrogation area.

26. The method of claim 23, wherein the alerting mechanism comprises an indicator that provides a first indication that no valid ADS-B signal is detected within the designated aircraft interrogation area when there is a flaw in the received ADS-B data or when no ADS-B data are received.

27. The method of claim 26, wherein the indicator further provides a second indication that a valid ADS-B signal is detected within the designated aircraft interrogation area when there is no flaw in the received ADS-B data.

28. The method of claim 27, wherein the indicator comprises a light that is illuminated with a specific color and pattern when there is no valid ADS-B signal or when no ADS-B data are received and with a different specific color and pattern when a valid ADS-B signal is detected.

29. The method of claim 26, wherein a no-valid ADS-B signal is indicated when the strength of the received ADS-B signal does not match a preselected value.

30. The method of claim 26, wherein a no valid ADS-B signal is indicated when the ADS-B position data in the received ADS-B data do not match position data of the aircraft in the designated aircraft interrogation area transmitted by an aircraft detection system configured to detect an aircraft's position within the designated aircraft interrogation area independently from any navigation source on the aircraft.

31. The method of claim 26, wherein a no valid ADS-B signal is indicated when aircraft type data in the received ADS-B data do not match a type of the aircraft in the designated aircraft interrogation area transmitted by an aircraft detection system configured to detect the type of the aircraft.

32. The method of claim 26, wherein a no valid ADS-B signal is indicated when an aircraft registration number in the received ADS-B data do not match a registration number of the aircraft in the designated aircraft interrogation area, transmitted by an aircraft detection system configured to detect the aircraft registration number.

33. The method of claim 23, wherein the alerting mechanism comprises an announcement on a voice radio frequency.

34. The method of claim 23, wherein the alerting mechanism comprises a data transmission over a wired or wireless communication system.

35. The method of claim 34, wherein said data transmission further comprises a video recording of the aircraft recorded by an electromagnetic imager.

36. The method of claim 34, wherein said data transmission is sent to one of an air traffic control facility, aircraft pilot, a security organization, police, homeland security, military, fire department, or airline operations control.

37. The method of claim 34, wherein said data transmission is received by an airline operations control and the transmitted data are cross-referenced with air traffic-control data provided by air traffic control data feeds including Aircraft Situation Display to Industry (ASDI) or Enhanced Traffic Management System (ETMS).

38. The method of claim 23, further comprising providing an aircraft detection system, wherein the aircraft detection system is configured to detect an aircraft entering the designated aircraft interrogation area, and to provide confirmation of the aircraft's location within the designated aircraft interrogation area.

39. The method of claim 38, wherein the aircraft detection system is configured to identify the type and registration number of the aircraft.

40. The method of claim 38, wherein the aircraft detection system comprises a visible-spectrum camera and image recognition software.

41. The method of claim 38, wherein the aircraft detection system comprises an IR-spectrum camera and image recognition software.

42. The method of claim 41, further comprising providing a processor configured to compare data received from the ADS-B receiver with data received from the aircraft detection system and activating the alerting mechanism if there is a discrepancy between the received ADS-B data and the aircraft detection system data.

43. A method for ensuring Automatic Dependent Surveillance-Broadcast (ADS-B) integrity of an aircraft comprising:
  providing an ADS-B receiver located outside of the aircraft;
  providing a processor, validity check software and air traffic control data feeds including Aircraft Situation Display to Industry (ASDI) or Enhanced Traffic Management System (ETMS);
  providing an alerting mechanism located outside of the aircraft and being configured to provide indications that are observable from any location within a designated aircraft interrogation area by crewmembers operating the aircraft;
  comparing data received from the ADS-B receiver with data received from the air traffic control data feeds by the processor and analyzing said data with said validity check software; and
  wherein the ADS-B data comprise position, velocity an identity data.

44. The method of claim 43, further comprising activating the alerting mechanism if the analysis by the validity check software indicates a discrepancy between the received ADS-B data and the air traffic control data feeds.

* * * * *